United States Patent [19] [11] 4,360,066
Mann [45] Nov. 23, 1982

[54] OSCILLATING DEVICE FOR GRAIN DRILLS

[76] Inventor: Fred W. Mann, Box 444, Waterville, Kans. 66548

[21] Appl. No.: 236,449

[22] Filed: Feb. 20, 1981

[51] Int. Cl.³ ............................................. A01B 35/32
[52] U.S. Cl. ..................................... 172/130; 172/469
[58] Field of Search ............... 172/126, 127, 128, 129, 172/130, 131, 132, 469; 74/522

[56] References Cited

U.S. PATENT DOCUMENTS

| 2,546,412 | 3/1951 | White | 172/130 |
| 3,139,941 | 7/1964 | Graham | 172/130 |
| 3,146,833 | 9/1964 | Friemel | 172/126 |
| 3,587,750 | 6/1971 | Cantral | 172/130 |
| 3,774,691 | 11/1973 | Oak | 172/130 |
| 3,948,326 | 4/1976 | Harbert | 172/130 |
| 3,955,627 | 5/1976 | Brown | 172/130 |

Primary Examiner—Richard J. Johnson
Attorney, Agent, or Firm—Litman, Day and McMahon

[57] ABSTRACT

An automatically oscillating device is provided for permitting opposing alternate movement by two associated movable members from a common center point.

10 Claims, 6 Drawing Figures

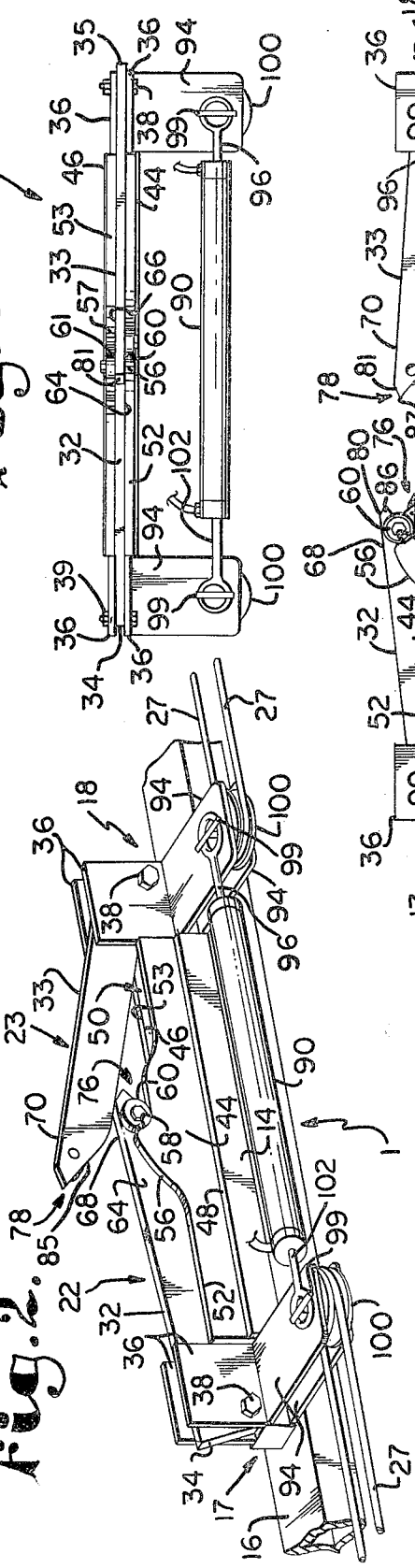

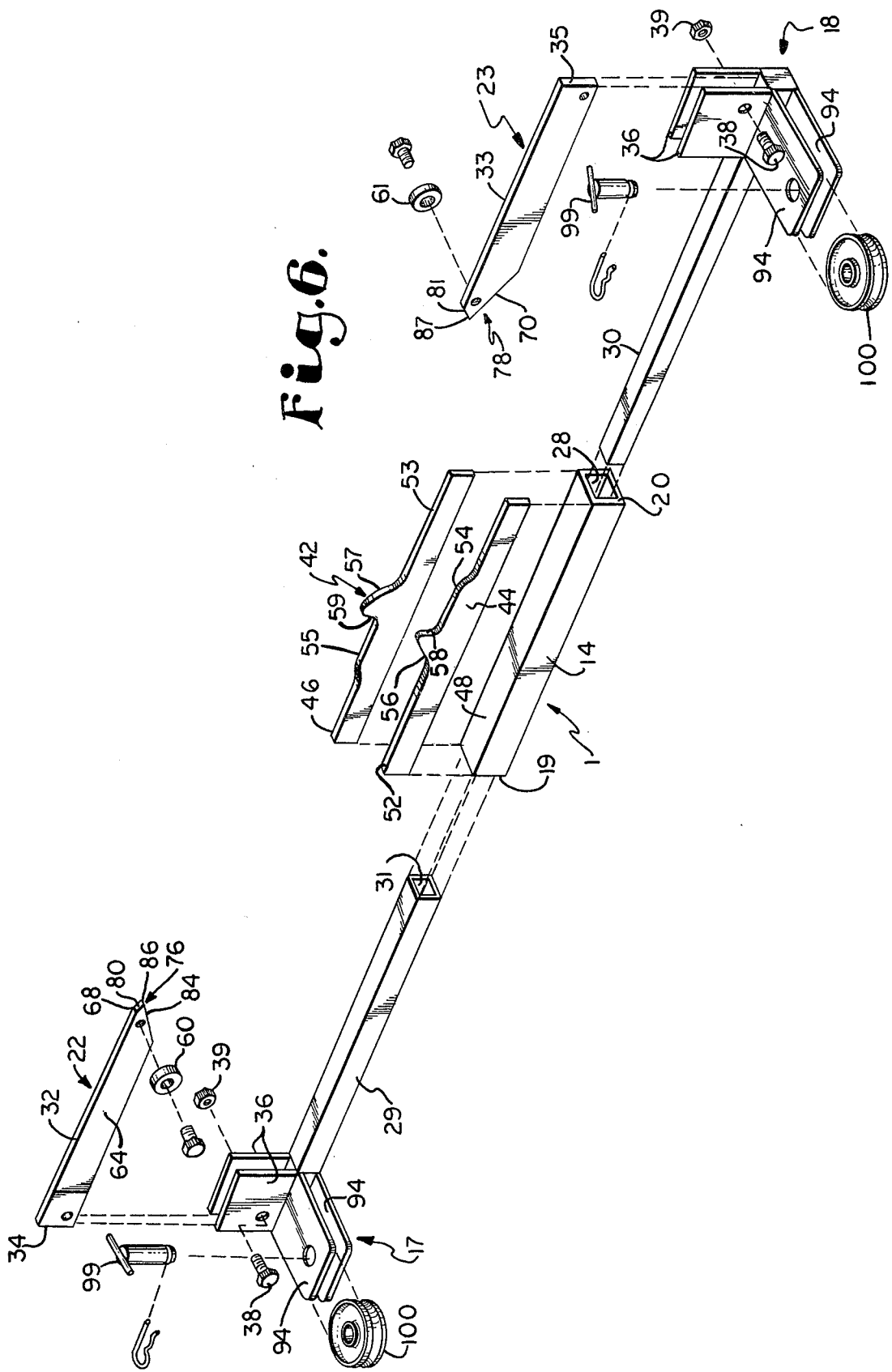

OSCILLATING DEVICE FOR GRAIN DRILLS

BACKGROUND OF THE INVENTION

This invention relates to agricultural implements in general and more particularly, to a row marker actuation device which allows each of two row markers to be alternately lifted and lowered.

It is necessary in many farming operations for the farmer to traverse a field in equally spaced apart swaths. An example is when planting, the farmer must plant adjacent swaths such that there is a constant space between the adjacent swath rows so that when cultivating, the cultivator teeth can be easily and consistently guided so as to engage the ground between the growing plants.

Row markers are used which comprise arms, each having a blade or other device suitable for leaving a mark on a ground surface at a distal end thereof. The row markers are pivotally attached to opposite sides of a farm implement and are adapted for alternately being lifted and lowered. As the farmer makes one swath through the field he will position one of two row markers which is located on the side of the implement nearest a previously untreated swath so as to leave a mark on an adjacent untreated soil surface parallel to the path of the implement. At the end of the field, the direction of the implement is reversed so as to work the next untreated soil surface with the implement following the previous mark left by the row marker. In particular, as the farmer reaches the end of the field and turns around, he will lift the previously lowered marker and lower the opposing marker so as to engage the untreated soil surface adjacent the swath about to be worked. The farm implement is again propelled across the field, this time with the opposite marker following, etching or marking the adjacent untreated surface and the implement follows the previous mark whereby it further engages untreated soil with consistent spacing between planting rows or furrows. This alternating process is continued until the field is completely worked. In order to alternately lift and lower the row markers the farmer must manually operate same or a suitable mechanism must be included on the farm implement which will provide the impetus for this alternating movement. Prior alternating mechanisms have been relatively complicated in nature with some using multiple hydraulic cylinders and others using complex selection and detent linkage systems.

OBJECTS OF THE INVENTION

Therefore, the principle objects of the present invention are: to provide a device which will alternately lift and lower opposing row markers; to provide such a device which is uncomplicated in design; to provide such a device which will automatically alternate the row markers in conjunction with raising and lowering of a farm implement at the end of a row or swath to allow for turning of the implement to reverse direction; to provide such a device which utilizes a single hydraulic cylinder attached at each of the opposite ends thereof to an associated movable link, which links are connected to the row markers; to further provide such a device wherein said links are adapted to allow opposing oscillating movement from a common center point; to provide such a center point with a cam lock alternately restraining movement therefrom of one of the links; to provide such a device which is simple in design, easy to manufacture, capable of extended useful life and particularly well adapted for the proposed use thereof.

Other objects and advantages of this invention will become apparent from the following description taken in connection with the accompanying drawings wherein are set forth by way of illustration and example certain embodiments of this invention.

SUMMARY OF THE INVENTION

An automatically oscillating device is provided which permits alternate opposing movement of two associated movable members. Row crop field markers communicate with the movable members and are alternately raised and lowered into contact with a field surface normally so as to mark a path to be followed by a tractor in traversing a field in adjacent swaths during which the tractor moves in opposed directions. The device comprises a channel member which is mounted on an implement frame and two movable members which reciprocate and oscillate within opposing ends of the channel member. A restraining means such as a cam lock is situated near a midportion of the tool bar. Link means are attached to each movable member which, when said members are biased inwardly, alternately engage the restraining means. An hydraulic cylinder is attached at both ends to said movable members. Upon actuation of the hydraulic cylinder, which biases the movable members apart, one link is restrained by the restraining means and the other link is moved outwardly thereby lowering the row marker on that side. Upon retraction of the hydraulic cylinder the first outwardly disposed link means contacts the second opposing link means disengaging the second link means from the cam lock while engaging the first link means with the cam lock. Upon a second outward actuation of the hydraulic cylinder, the second link is biased outwardly thereby lowering the opposing or second row marker.

The drawings constitute a part of this specification and include exemplary embodiments of the present invention and illustrate various objects and features thereof.

BRIEF DESCRIPTION OF THE DRAWINGS

FIG. 2 is an enlarged perspective view of the oscillating device and a fragmentary perspective view of the implement.

FIG. 3 is an enlarged top plan view of the oscillating device.

FIG. 4 is an enlarged front elevational view of the oscillating device with members thereof in a first marker activating position.

FIG. 5 is an enlarged front elevational view of the oscillating device with members thereof in a second marker activating position.

FIG. 6 is an enlarged and exploded perspective view of the oscillating device.

DETAILED DESCRIPTION OF THE PREFERRED EMBODIMENT

Figure 1:
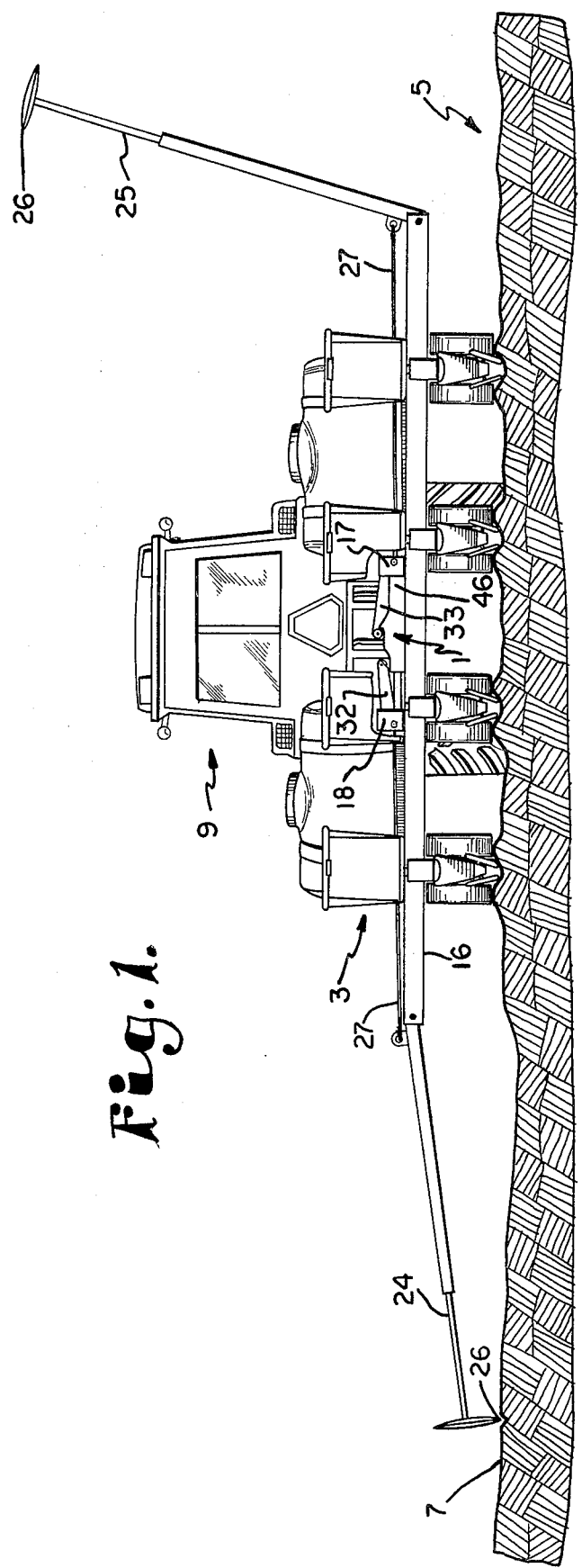
FIG. 1 is a rear elevational view of a tractor and a farm implement having an oscillating device according to the present invention attached thereto and operating markers in a worked agricultural field.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings, the reference numeral 1 generally designates an automatically oscillating device mounted on a suitable farm implement 3, which is being drawn through a field 5, having a soil surface 7, by a motive means such as farm tractor 9. The device 1 comprises a channeled frame member 14, see FIGS. 2 through 6, which is transversely mounted on the farm implement 3 by the attachment thereof through welding, bolting, or the like to a conventional tool bar 16. Movable members 17 and 18 are slidably located within the frame member 14 and entering the frame member 14 at opposing ends 19 and 20 thereof respectively. Each movable member 17 and 18 alternatively oscillates between an outward and an inward position with respect to the frame member 14 and extend and retract respectively with respect to the opposite movable member. Pivotally attached to each movable member 17 and 18 are link means 22 and 23 respectively. Two row markers 24 and 25, each having a soil etching blade 26, are hingedly attached to the farm implement 3 at opposing sides thereof and communicate with the movable members 17 and 18 respectively by means of cables 27. As shown in FIG. 6 the frame member 14 has a generally rectangular channel 28 defined therein. The movable members 17 and 18 have elongate members 29 and 30 respectively which are received and reciprocate within the channel 28. In the illustrated embodiment, the elongate member 29 is snugly but slidably received within the frame member 14 and has a channel 31 defined therein which receives elongate member 30 thereby allowing both movable members 17 and 18 to be positioned inwardly as shown in FIG. 2, that is, with member 30 partly received within part of member 29.

The link means 22 and 23 comprise two inwardly projecting links or arms 32 and 33 which are pivotally connected at laterally outward ends thereof 34 and 35 respectively to tabs 36 by pins 38 having suitable fasteners such as nuts 39. The tabs 36 extend vertically upwardly from and are securely attached to movable members 17 and 18 at the outer ends thereof. The tabs 36 each comprise a pair of generally planar and parallel plates which are horizontally spaced and attached at a lower end thereof to an associated elongate member 29 or 30.

A link restraining means 42 is positioned on said frame member 14 and communicates with arm members 32 and 33. The restraining means 42 includes two spaced apart generally vertical plates 44 and 46 which are attached near lower ends thereof to a top surface 48 of the frame member 14 on opposing sides thereof forming therebetween a passageway 50. The top contour or surface of the plates 44 and 46 comprise a linear cam means having respectively first horizontal portions 52 and 53, second horizontal portions 54 and 55 raised above first horizontal portions 52 and 53 respectively, inclined portions 56 and 57 raising from first horizontal portions 52 and 53, and substantially vertical cam lock or inner limit portions 58 and 59. Rollers 60 and 61 comprise a cam follower means, which are rotatingly attached to opposing vertical surfaces 64 and 66 of free ends 68 and 70 of arms 32 and 33 respectively, and which slidably engage and ride on the top surface of restraining plates 44 and 46 respectively. As shown in FIG. 6, the plates 44 and 46 are identical but are attached in an opposing manner to the frame member top surface 48 such that the cam locks 58 and 59 face one another in a displaced, crossing relation.

As best shown in FIG. 2, when both movable members 17 and 18 are retracted inwardly the arm member free ends 68 and 70 alternately overlap. To accomplish this, the arms 32 and 33 have at their free end selection means which, in the illustrated embodiment, comprises a nose portion 76 and 78 respectively including two inclined surfaces, a first surface 80 and 81 respectively, which angles downwardly and inwardly from a top surface of arms 32 and 33 and a second surface, 84 and 85 respectively, which angles downwardly and outwardly forming at the juncture thereof a tip portion 86 and 87 respectively.

A power ram or motive means such as a bi-directional hydraulic cylinder 90 is positioned in engageable relationship with the movable members 17 and 18. Tabs 94, each comprising a pair of vertically spaced and generally parallel plates, extend outwardly in a generally horizontal fashion from movable member 17 and 18 to retainingly engage rod 96 and plunger 102 of the hydraulic cylinder 90 by means of pins 99. Sheaves 100 which are freely rotatable about the axes thereof are positioned between the tabs 94 such as to allow the cables 27, which extend to the row markers to rotate therearound.

In operation, when transporting the farm implement 3 to an agriculture field, both row markers, 24 and 25, will be secured in a raised position. To accomplish this the hydraulic ram 90 will be activated so as to retract to a position as shown in FIG. 2. When the operator has reached his desired destination, and desires to lower a row marker he activates the hydraulic cylinder 90 so as to extend the plunger 102 outwardly therefrom. As shown in FIG. 2, the result is that the right movable member 18 when looking from the front of the tractor 9 to the rear, is free to slide along the top of the left movable member 17 and extend outwardly allowing right marker 24 to drop into said engaging position. Meanwhile, the left movable member 17 is restrained from movement by roller 60 which is trapped in locking engagement with cam lock 58.

When it is desired to raise the right marker 24 and lower the left marker 25, preferably at the conclusion of making a complete swath through the field, the operator first actuates the hydraulic cylinder 90 to retract the plunger 102. When this occurs, the right movable member 18 is retracted inwardly which causes the right marker 24 to raise by means of tension transmitted by the cable 27 associated therewith. As retraction continues, the right member nose tip 87 comes in contact with inclined surface 84 of nose 76. Generally simultaneously, the right arm roller 61 will engage the inclined portion 57 of plate 46 which will bias the free end 70 of the arm 33 upwardly and will also bias the arm 32 upwardly since the nose tip 87 is at this time positioned beneath the arm 32, so that roller 60 is disengaged from retaining contact with channel lock 58. As the ram 102 retracts further, roller 61 travels past the inclined portion 57 and is secured against lateral movement by cam lock 59 while further biasing the free end of the arm 32 upwardly. The arms have now reversed position with respect to that shown in FIG. 2. The operator will now actuate the power ram to extend the plunger 102. Since roller 61 is in locking contact with cam lock 59, the right movable member 18 is prohibited from outward movement. The left movable member 17 is free since roller 60 is out of contact with cam lock 58 and moves outwardly as the plunger 102 is extended thereby allowing associated row marker 25 to fall into engaging contact with the soil surface.

It is noted that upon retraction of the plunger 102 a second time, the left arm nose tip 86 will engage the right arm lower inclined surface 85 biasing same upwardly during retraction. When roller 60 engages inclined surface 56, both arms will simultaneously be biased upwardly thereby allowing roller 61 to come out of contact with cam lock 59 and forcing roller 60 to come into engaging contact with cam lock 58, as is shown in FIG. 2. Thereafter upon extension of the hydraulic cylinder plunger 102 a further time, the right movable member 18 will extend outwardly thereby allowing the right row marker 24 to fall again. Thus, it is seen that the movable members 17 and 18 oscillate between an outward position and an inward position with respect to frame member 14, thereby providing for alternative lifting and lowering or the row markers 24 and 25.

Cables 27 are attached at their one end to row markers 24 and 25 and at their other end to the tool bar 16 at a point not shown and wrap around sheaves 100. This allows for a doubling of the distance each of the row markers 24 and 25 move with respect to the distance the respective movable member 18 and 17 moves.

It is to be understood that while certain embodiments of the present invention have been illustrated and described herein, it is not to be limited to the specific forms or arrangement of parts described and shown.

What is claimed and desired to secure by Letters Patent is:

1. A device for producing alternating outward movement by two opposed members from a centerpoint comprising:
   (a) an elongate frame member having opposing end portions and a center portion;
   (b) first and second movable members slidably engaging said frame member, each of said movable members movable between an inward position and an outward position relative to said frame member center portion respectively;
   (c) motor means connected to each of said movable members selectively biasing each of said movable members between said inward and outward positions respectively;
   (d) restraining means securely mounted on said frame member to selectively restrain one of said movable members in said respective inward portion thereof;
   (e) selection means to alternately restrain one of said movable members in said respective inward position while allowing the other of said movable members to be motivated by said motor means to move from said respective inward position to said respective outward position and thereafter back to said respective inward position thereby allowing said movable members to alternately and opposingly oscillate between their respective inward and outward positions; and
   (f) an elongate link member pivotally attached to each of said first and second movable members at a first end thereof, said link members generally extending from the attachments thereof to respective movable members toward one another; each of said link members including a second end in overlapping relationship to each other and to said frame member center portion when both of said movable members are in the respective inward positions thereof;
   (g) said restraining means including:
      (1) two spaced apart plates securely positioned on said frame member defining therebetween a passageway adapted to receive therein said link members;
      (2) a pair of rollers rotatably mounted on each link member respectively at the second end thereof and on opposing sides thereof; each of said rollers operably riding on a top surface of one of said plates; and wherein
      (3) each of said plate top surfaces comprises and presents in succession to an associated roller when an associated movable member is moved from said outward position to said inward position;
         (i) a first generally horizontally aligned section;
         (ii) a second section inclined upwardly with respect to said surface first section; and
         (iii) a cam lock roller retainer having a generally vertical portion adjacent and connected with said plate top surface inclined section and a generally horizontal portion spaced below the location of connection of said roller retainer vertical portion and said plate surface inclined section.

2. A device as set forth in claim 1 wherein said selection means comprises:
   (a) an inclined nose portion positioned at each link member second end such that, when an associated movable member is moving to the inward position thereof, the nose section thereof engages and urges upwardly the nose section of the opposite movable member.

3. A device as in claim 2 wherein said nose section comprises:
   (a) a first inclined surface; and
   (b) a second inclined surface; said first and second surfaces joining so as to form an acute angle therebetween and defining at the junction thereof a tip projecting outwardly in opposed direction to the attachment of said respective link to said associated movable member.

4. A device as in claim 3 wherein:
   (a) said cam lock roller retainer is vertically spaced above said restraining means top surface first portion such that when a roller associated with a first of said movable members is contacting an associated cam lock roller retainer, the associated link member nose section second inclined surface thereof is contacted by the tip and first inclined surface of the link member associated with the other of said movable members as said other movable member is moved from said respective outward position to said respective inward position, thereby urging the roller associated with said first movable member upward and out of contact with the cam lock portion associated therewith such that said first movable member is free to move to the outward position thereof.

5. A device as set forth in claim 5 wherein:
   (a) said roller associated with said other link member and movable member which is moving from said outward position to said inward position is free to traverse an associated plate top surface such that said roller at the end of said traverse is operably positioned with said cam lock retainer vertical portion on one side thereof; and (b) the weight of said second link and gravity bias said roller associated with said first link member to remain on an associated cam lock retainer horizontal portion;

(c) whereby during operation of said motor means to horizontally bias said movable members apart, movement of said other link and movable member in a horizontal direction is resisted by said cam lock retainer vertical portion thereby selectively allowing said first link to move in a generally horizontal direction.

6. A device as set forth in claim 2 wherein:

(a) said frame member is mounted on a farm implement, adapted to be drawn through a field having a soil surface by motive means;

(b) said movable members have associated each therewith a row marker, each row marker including a blade at a free end thereof, said row markers being hingedly attached to said farm implement such that when a movable member is in the upward position thereof the row marker associated therewith is located such that the associated blade does not contact the soil surface; and, when a movable member is in the outward position thereof the associated row marker is located such that the associated row marker blade contacts the soil surface.

7. A device for providing alternating outward movement by two opposed members from a centerpoint comprising:

(a) an elongate frame member having opposing end portions and a center portion;

(b) first and second arms slidably engaging said frame member; said arms respectively having a first and a second link member pivotally connected thereto at a first end thereof; said link members extending inwardly toward said frame center portion and positioned in a parallel and alternately overlapping relationship;

(c) first and second linear cam means having inner limit portions and defining a passageway with said link members riding therein between a respective inward and an outward position;

(d) first and second cam follower means respectively connected to said link members at a second end thereof and engaging said first and second cam means and movable therealong toward and away from said inner limit portions; and (e) motive means operably connected to said arms and moving said links in connection therewith whereby the respective follower means contact and stop against said inner limits and are alternately restrained thereby while said opposing arm is oscillated outwardly.

8. A device as set forth in claim 7 wherein:

(a) said frame member includes a channel therein; and (b) said movable members include elongate sections which are received in said channel and which reciprocate therein.

9. In a farm implement having opposing row markers mounted thereon adapted to traverse a field and etch an untreated soil surface thereof with one of the row markers at a location transversely spaced from the farm implement, the improvement comprising a device to selectively and alternately lift and lower each of said row markers so as to engage the untreated soil surface as the farm implement traverses adjacent swaths in said field, said device including:

(a) an elongate frame member having opposing end portions, a center portion and a channel therethrough, said frame member being mounted on the farm implement;

(b) first and second movable members; each of said movable members including an elongate portion which is respectively slidably received within said frame member channel; each of said movable members movable between an inward position and an outward position relative to said frame member center portion respectively; each of said movable members having associated therewith one of said row markers; each of said row markers including a blade at a free end thereof and being hingedly attached to said farm implement such that when a movable member is in the inward position thereof the row marker associated therewith is pivotally positioned such that the associated blade does not contact the soil surface; and, when a movable member is in the outward position thereof the associated row marker is pivotally positioned such that the associated row marker blade contacts the soil surface;

(c) an elongate link member pivotally attached to each of said first and second movable members at a first end thereof, said link members generally extending from the attachments thereof to said respective movable members toward one another; each of said link members including a second end in overlapping relationship relative to each other and to said frame member center portion when both of said movable members are in the respective inward positions thereof;

(d) motor means connected to each of said movable members selectively biasing each of said movable members between said inward and outward positions respectively, said motor means comprising a bidirectional hydraulic ram;

(e) restraining means securely mounted on said frame member to selectively restrain one of said movable members in said respective inward position thereof; said restraining means including:

(1) two spaced apart plates securely positioned on said frame member defining therebetween a passageway adapted to receive therein said link members;

(2) a pair of rollers rotatably mounted on each link member respectively at a second end portion thereof and on opposing sides thereof; each of said rollers operably riding on a top surface of one of said plates; and wherein (3) each of said plate top surfaces comprises and presents in succession to an associated roller when an associated movable member is moved from said outward position to said inward position;

(i) a first generally horizontal section;

(ii) an upwardly inclined section; and (iii) a cam lock roller retainer having a generally vertical portion adjacent and connected with said plate top surface inclined section and a generally horizontal portion positioned below the location of connection between said retainer vertical portion and said plate top surface inclined section; and (f) selection means to alternately restrain one of said movable members in said respective inward position thereof while allowing the other of said movable members to be motivated by said motor means from said respective inward position to said respective outward position and thereafter back to said respective inward position; said selection means including an inclined nose portion at each link member second end located such that when a first movable member is moving to the inward position thereof, an associated nose portion thereof engages and urges upwardly the nose portion of the opposite movable member; each of said nose portions including a first inclined surface, and a second inclined surface, said first and second surfaces joining so as to form an acute angle therebetween and defining at the junction thereof a tip projecting outwardly in opposed direction to the attachment of said respective link to said associated movable member such that, when a roller associated with a first of said movable members is contacting an associated cam lock roller retainer, an associated link member nose portion second inclined surface thereof is contacted by the tip and first inclined surface of the nose portion associated with a second of said movable members as said second movable member is moved from said respective outward position to said respective inward position, thereby urging said first movable member associated roller upward and out of contact with said associated cam lock roller retainer portion such that said first movable member is free to move to the outward portion thereof; and wherein (g) said roller associated with said second movable member is free to traverse an associated plate top surface such that said roller at the end of said traverse is operably positioned with said cam lock roller retainer vertical portion on one side thereof; and the weight of said other link and gravity bias said roller associated with said second movable member to remain on an associated cam lock retainer horizontal portion whereby during operation of said motor means to horizontally bias said movable members apart, movement of said second movable member in a horizontal direction is resisted by said cam lock retainer vertical portion thereby selectively allowing said first movable member to move in a generally horizontal direction outwardly from said frame member center portion allowing the row marker blade associated therewith to engage the untreated soil surface.

10. A device providing alternating reciprocal movement by two opposed members relative to a centerpoint and comprising:
(a) an elongate central frame member having opposing end portions and a center portion with a channel therein;
(b) opposed first and second movable members slidably engaging said channel and having respective outer ends and first and second link members on said outer ends; said link members having respective nose portions in alternately overlapping relationship;
(c) first and second linear cam means on said frame member in parallel arrangement and forming a passageway therebetween receiving said link members; each of said cam means having an inner limit means and an inclined surface with the respective inclined surfaces of said first and second cam means in displaced, crossing relationship;
(d) first and second cam followers respectively attached to said link members and slidably engaging said first and second cam means; and
(e) motive means operatively connected to and selectively biasing said movable members between inward and outward positions relative to said frame member;
(f) whereby said link members move toward one another when either of said movable members move inwardly and urge one of said cam followers along said cam means and said inclined surfaces and into contact and overlapping relationship with said nose portion of the other of said link members thereby alternating said overlapping relationship, and terminating at said inner limit means; thereby inhibiting the other of said movable members from moving outwardly when one of said movable members is moved outwardly to provide oscillatory movement.

* * * * *